(12) United States Patent
Itkin et al.

(10) Patent No.: US 9,998,359 B2
(45) Date of Patent: Jun. 12, 2018

(54) SIMULTANEOUS OPERATION OF REMOTE MANAGEMENT AND LINK AGGREGATION

(71) Applicant: Mellanox Technologies Ltd., Yokneam (IL)

(72) Inventors: Yuval Itkin, Zoran (IL); Dror Goldenberg, Zichron Yaakov (IL)

(73) Assignee: Mellanox Technologies, Ltd., Yokneam (IL)

( * ) Notice: Subject to any disclaimer, the term of this patent is extended or adjusted under 35 U.S.C. 154(b) by 216 days.

(21) Appl. No.: 14/547,160

(22) Filed: Nov. 19, 2014

(65) Prior Publication Data

US 2015/0172112 A1    Jun. 18, 2015

Related U.S. Application Data

(60) Provisional application No. 61/917,361, filed on Dec. 18, 2013.

(51) Int. Cl.
*H04L 12/709* (2013.01)
*H04L 12/24* (2006.01)
*H04L 12/26* (2006.01)

(52) U.S. Cl.
CPC ........ *H04L 45/245* (2013.01); *H04L 41/0668* (2013.01); *H04L 41/085* (2013.01); *H04L 43/0817* (2013.01); *Y02D 50/30* (2018.01)

(58) Field of Classification Search
CPC . H04L 45/245; H04L 41/0668; H04L 41/085; H04L 43/0817; Y02B 60/33
See application file for complete search history.

(56) References Cited

U.S. PATENT DOCUMENTS

| | | | |
|---|---|---|---|
| 5,805,816 A | 9/1998 | Picazo et al. | |
| 6,198,752 B1 | 3/2001 | Lee | |
| 6,289,388 B1 | 9/2001 | Disney et al. | |
| 6,393,483 B1 * | 5/2002 | Latif | .............. H04L 41/0668 370/230 |
| 7,046,668 B2 | 5/2006 | Pettey et al. | |
| 7,103,064 B2 | 11/2006 | Pettey et al. | |
| 7,245,627 B2 | 7/2007 | Goldenberg | |
| 7,447,778 B2 | 11/2008 | Matters et al. | |
| 7,457,906 B2 | 11/2008 | Pettey et al. | |
| 7,464,174 B1 | 12/2008 | Ngai | |
| 7,493,416 B2 | 2/2009 | Pettey | |

(Continued)

FOREIGN PATENT DOCUMENTS

CN        103546586 A    1/2014

OTHER PUBLICATIONS

U.S. Appl. No. 13/467,161 Office Action dated Feb. 5, 2015.

(Continued)

*Primary Examiner* — Christopher Grey
(74) *Attorney, Agent, or Firm* — D.Kligler IP Services Ltd.

(57) ABSTRACT

A method in a network node that includes a network adapter, a Baseboard Management Controller (BMC) and a host, includes connecting to a switch in a communication network using first and second ports of the network adapter, as member ports of a Link Aggregation Group (LAG). Management and data packets are simultaneously exchanged over the communication network via the LAG member ports, so that the management packets are exchanged between the BMC and a control server, and the data packets between the host and a remote node.

24 Claims, 4 Drawing Sheets

(56) References Cited

U.S. PATENT DOCUMENTS

| | | | |
|---|---|---|---|
| 7,502,370 | B2 | 3/2009 | Pettey |
| 7,512,717 | B2 | 3/2009 | Pettey |
| 7,519,167 | B2 | 4/2009 | Jreij et al. |
| 7,600,112 | B2 | 10/2009 | Khatri et al. |
| 7,617,333 | B2 | 11/2009 | Pettey |
| 7,620,057 | B1 | 11/2009 | Aloni et al. |
| 7,620,064 | B2 | 11/2009 | Pettey et al. |
| 7,620,066 | B2 | 11/2009 | Pettey et al. |
| 7,664,909 | B2 | 2/2010 | Pettey |
| 7,668,941 | B1 | 2/2010 | Kathandapani |
| 7,688,838 | B1 | 3/2010 | Aloni et al. |
| 7,705,850 | B1 | 4/2010 | Tsu |
| 7,706,372 | B2 | 4/2010 | Pettey et al. |
| 7,782,893 | B2 | 8/2010 | Pettey et al. |
| 7,925,795 | B2 | 4/2011 | Tamir et al. |
| 8,032,659 | B2 | 10/2011 | Pettey |
| 8,228,848 | B2 * | 7/2012 | Vos .................. H04L 29/12367 370/328 |
| 8,346,884 | B2 | 1/2013 | Pettey |
| 8,400,917 | B2 | 3/2013 | Tripathi et al. |
| 8,503,468 | B2 * | 8/2013 | Akyol .................. G06F 13/385 370/389 |
| 8,913,615 | B2 | 12/2014 | Pettey |
| 9,197,490 | B2 * | 11/2015 | Dharmadhikari ....... H04L 41/04 |
| 2003/0130969 | A1 | 7/2003 | Hawkins et al. |
| 2007/0002826 | A1 * | 1/2007 | Bennett .............. H04L 41/0806 370/351 |
| 2007/0233455 | A1 | 10/2007 | Zimmer et al. |
| 2008/0043769 | A1 * | 2/2008 | Hirai .................... H04L 41/042 370/420 |
| 2008/0080512 | A1 | 4/2008 | Gofman et al. |
| 2008/0086580 | A1 | 4/2008 | Zhang et al. |
| 2008/0183882 | A1 | 7/2008 | Flynn et al. |
| 2009/0100194 | A1 * | 4/2009 | Bhadri .................. G06F 13/105 709/244 |
| 2009/0182799 | A1 * | 7/2009 | Huang .................... H04L 12/24 709/201 |
| 2009/0232136 | A1 * | 9/2009 | Rodriguez ......... H04Q 11/0067 370/390 |
| 2011/0040917 | A1 * | 2/2011 | Lambert ................. H04L 69/18 710/301 |
| 2011/0078299 | A1 * | 3/2011 | Nagapudi ............... H04L 12/12 709/223 |
| 2012/0023252 | A1 * | 1/2012 | Helmke .................. H04L 25/14 709/231 |
| 2012/0218905 | A1 | 8/2012 | Pettey |
| 2012/0221705 | A1 | 8/2012 | Pettey |
| 2012/0258689 | A1 | 10/2012 | Pettey |
| 2013/0145072 | A1 | 6/2013 | Venkataraghavah et al. |
| 2013/0185402 | A1 | 7/2013 | Ayanam et al. |
| 2013/0289926 | A1 | 10/2013 | Maity et al. |
| 2013/0304903 | A1 | 11/2013 | Mick et al. |
| 2014/0059225 | A1 * | 2/2014 | Gasparakis ......... H04L 29/0818 709/226 |
| 2014/0059266 | A1 | 2/2014 | Ben-Michael et al. |
| 2014/0129741 | A1 | 5/2014 | Shahar et al. |
| 2014/0195657 | A1 | 7/2014 | Bhatia et al. |
| 2014/0195669 | A1 | 7/2014 | Bhatia et al. |
| 2014/0195704 | A1 | 7/2014 | Bhatia et al. |
| 2014/0229758 | A1 | 8/2014 | Richardson et al. |
| 2014/0280837 | A1 | 9/2014 | Ayanam et al. |
| 2014/0280947 | A1 | 9/2014 | Christopher et al. |
| 2014/0344431 | A1 | 11/2014 | Hsu et al. |

OTHER PUBLICATIONS

DMTF Standard, "Management Component Transport Protocol (MCTP) Base Specification", Document No. DSP0236,version 1.2. 0, 87 pages, Jan. 24, 2013.

DMTF Standard, "Network Controller Sideband Interface (NC-SI) Specification",Document No. 10 DSP0222, version 1.0.1, 124 pages, Jan. 24, 2013.

DMTF Standard, "NC-SI over MCTP Binding Specification," Document No. DSP0261, version 1.0.0, 31 pages, Aug. 22, 2013.

SBS Implementers Forum, "System Management Bus (SMBus) Specification",version 2.0 , 59 pages, Aug. 3, 2000.

Intel Corporation, "Preboot Execution Environment (PXE) Specification",version 2.1, 103 pages, Sep. 20, 1999.

Amd, "Magic Packet Technology," publication No. 20213, revision A, Amendment/0, 6 pages, Nov. 1995.

Intel et al., "IPMI—Intelligent Platform Management Interface Specification, second generation", version 2.0, revision 1.1 , 644 pages, Oct. 1, 2013.

Linux Bonding Driver Documentation, 43 pages, Apr. 27, 2011.

IEEE Standard 802.1AX "IEEE Computer Society Standard for Local and metropolitan area networks—Link Aggregation", 163 pages, Nov. 3, 2008.

Itkin et al, U.S. Appl. No. 14/583,124 dated Dec. 25, 2014.

PCT Express Base Specification, Revision 3.0, 860 pages, Nov. 10, 2010.

Budruk et al., PCI Express System Architecture, 222 pages, Apr. 2008.

PCT Express to PCI/PCI-X Bridge Specification, Revision 1.0., 176 pages, Jul. 14, 2003.

DMTF Standard, "Management Component Transport Protocol (MCTP) SMBus/I2C Transport Binding Specification", Document No. DSP0237, version 1.1.0, 42 pages, Jul. 28, 2009.

DMTF Standard, "Management Component Transport Protocol 5 (MCTP) PCIe VDM Transport Binding 6 Specification", Document No. DSP0238, Version 1.1.2, 19 pages, Dec. 7, 2014.

Patrick, M., "DHCP Relay Agent Information Option", IETF Network Working Group, RFC 3046, 14 pages, Jan. 2001.

Miles et al., "Lightweight DHCPv6 Relay Agent", IETF, RFC 6221, 18 pages, May 2001.

U.S. Appl. No. 14/628,256 Office Action dated Dec. 1, 2016.

U.S. Appl. No. 14/583,124 Office Action dated Oct. 6, 2017.

* cited by examiner

SIMULTANEOUS OPERATION OF REMOTE MANAGEMENT AND LINK AGGREGATION

CROSS-REFERENCE TO RELATED APPLICATIONS

This application claims the benefit of U.S. Provisional Patent Application 61/917,361, filed Dec. 18, 2013, whose disclosure is incorporated herein by reference.

FIELD OF THE INVENTION

The present invention relates generally to communication networks, and particularly to methods and systems for enabling simultaneous operation of remote management and link aggregation.

BACKGROUND OF THE INVENTION

In various communication systems, multiple physical communication links are aggregated to form a single logical trunk, which is referred to as a Link Aggregation Group (LAG). The physical links that are grouped in the LAG comprise the LAG members. For setting up link aggregation, the LAG members can be configured using, for example, the IEEE 802.1AX Link Aggregation Control Protocol (LACP). The LACP specifications are described, for example, in IEEE standard 802.1AX-2008, titled "IEEE Standard for Local and metropolitan area networks—Link Aggregation," Sep. 26, 2008, which is incorporated herein by reference.

SUMMARY OF THE INVENTION

An embodiment of the present invention that is described herein provides a method in a network node that includes a network adapter, a Baseboard Management Controller (BMC) and a host. The method includes connecting to a switch in a communication network using first and second ports of the network adapter, as member ports of a Link Aggregation Group (LAG). Management and data packets are simultaneously exchanged over the communication network via the LAG member ports, so that the management packets are exchanged between the BMC and a control server, and the data packets between the host and a remote node.

In some embodiments, simultaneously exchanging the data packets and the management packets includes executing, in the network adapter, a Link Aggregation Control Protocol (LACP) that negotiates a LAG configuration with the switch. In other embodiments, connecting to the switch includes selecting one of the first and second ports for outgoing management packets so that a port that was defined by the LACP as a LAG member port is selected prior to other ports. In yet other embodiments, exchanging the data packets and the management packets includes separating between the data packets and the management packets that are received over each of the first and second ports, forwarding the management packets to the BMC and forwarding the data packets to the host.

In an embodiment, forwarding the management packets includes indicating to the BMC a total number of the management packets received on both the first and the second ports. In another embodiment, exchanging the management packets includes receiving duplicate management packets on the first and second ports, and wherein forwarding the management packets includes forwarding only one copy of a given duplicate management packet to the BMC. In yet another embodiment, exchanging the management packets includes sending to the control server configuration and dynamic status information via both the first and second ports.

In some embodiments, the method includes indicating to the BMC a link up status by performing a logical OR between respective individual link up status indications of the first and second ports. In other embodiments, connecting to the switch includes operating the first and second ports in a power saving mode of the network adapter, by activating only the second port in response to a connection failure that occurs when activating only the first port. In yet other embodiments, exchanging the management packets and the data packets includes delivering the management packets and the data packets via an active port selected between the first and second ports, and switching to the other of the first and second ports in response to detecting a link failure on the active port.

In an embodiment, connecting to the switch includes executing a Link Aggregation Control Protocol (LACP) that negotiates a LAG configuration with the switch. In another embodiment, executing the LACP comprises executing the LACP in a bonding driver of the network node, and connecting to the switch includes selecting one of the first and second ports for outgoing management packets so that a port that was defined by the LACP as a LAG member port is selected prior to other ports.

There is additionally provided, in accordance with an embodiment of the present invention, a network adapter in a network node. The network adapter includes first and second ports, and circuitry. The ports are configured to connect to a switch in a communication network, as member ports of a Link Aggregation Group (LAG). The circuitry is configured to simultaneously exchange management packets between a Baseboard Management Controller (BMC) of the network node and a control server, and data packets between a host of the network node and a remote node, over the communication network via the LAG member ports.

The present invention will be more fully understood from the following detailed description of the embodiments thereof, taken together with the drawings in which:

DETAILED DESCRIPTION OF EMBODIMENTS

Overview

Figure 1:
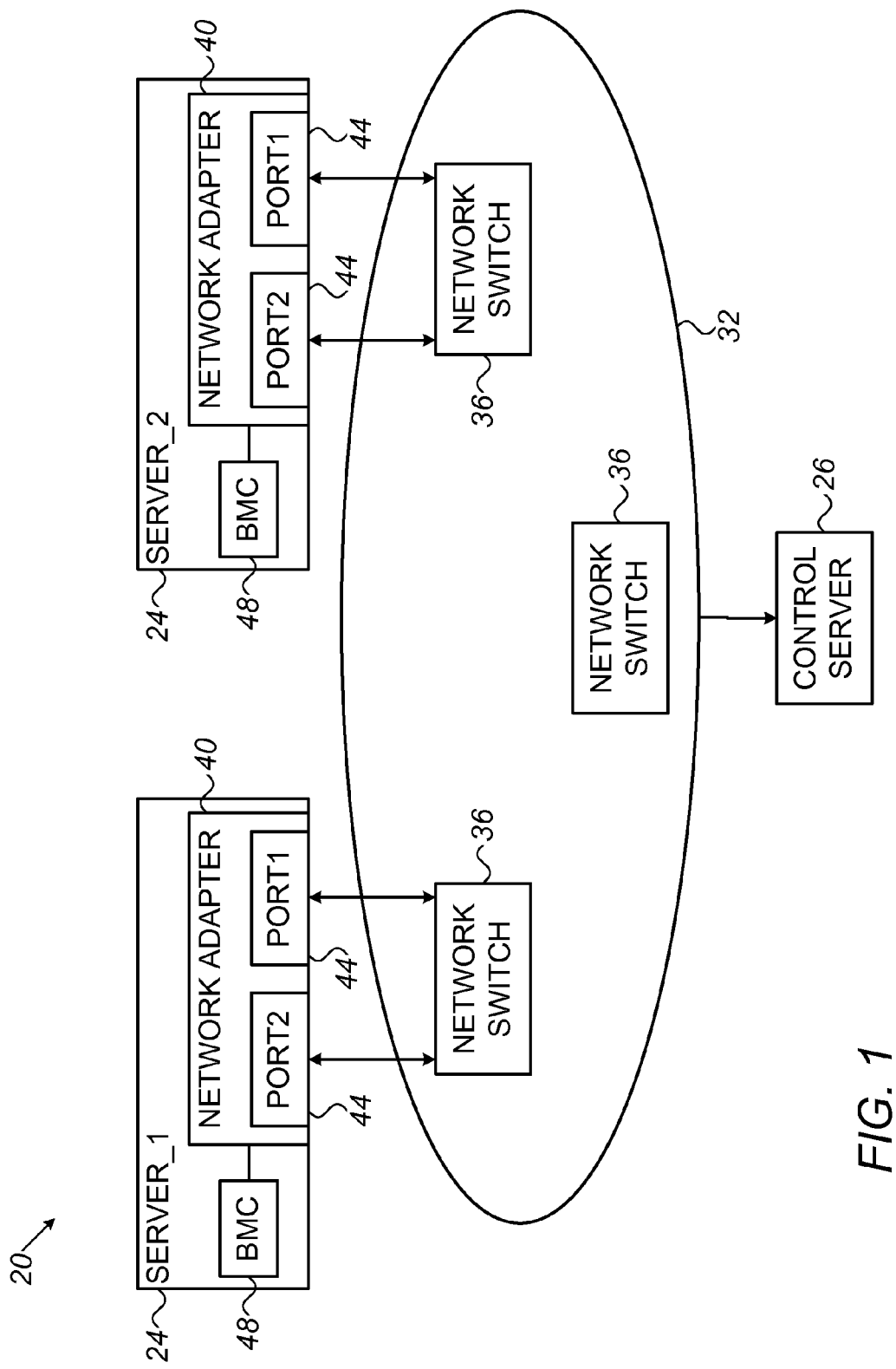
FIG. 1 is a block diagram that schematically illustrates a computer system, in accordance with an embodiment that is described herein.

Embodiments of the present invention that are described herein provide improved methods and systems for enabling simultaneous delivery of host data traffic and BMC management traffic over aggregated links. In some embodiments, a device (e.g., server) connected to a communication network is equipped with means that enable remote monitoring and control of the device. Such remote control may, for example, reduce maintenance costs of managing server farms that typically comprise a large number of servers. Some disclosed server configurations, in addition to a host processor and network interface controller (NIC), are also equipped with a Baseboard Management Controller (BMC), which is a dedicated processor used for remotely monitoring and controlling the server over the network.

The BMC typically connects to the network interface controller via a dedicated sideband channel, and accesses the communication network via the network interface controller. In a typical implementation, the server CPU (also referred to as server host) and the BMC communicate separate types of traffic. Traffic (e.g., packets) communicated with the server host is referred to herein as "data traffic," whereas traffic communicated with the BMC is referred to herein as "management traffic." The BMC typically uses one or more ports that reside in the network interface controller for accessing the network.

Link aggregation in communication systems is a technique for bundling multiple physical communication links to form a single logical trunk. The aggregated trunk is referred to as a Link Aggregation Group (LAG). The physical links that are grouped in the LAG are referred to as the LAG member links, or simply LAG members. The ports allocated to the LAG members are also referred to as the member ports of the LAG.

Link aggregation is mainly twofold advantageous over using non-aggregated links. Firstly, the bandwidth of the aggregated trunk approximately equals the sum of the LAG members' bandwidths, thus providing increased bandwidth over the logical trunk. Secondly, link aggregation provides redundancy and high availability among the LAG members, so that when a physical link LAG member fails, the full traffic can still be delivered over the other LAG links that remain operative.

For setting up link aggregation, the LAG members can be configured manually (i.e., static configuration), or dynamically using, for example, the IEEE 802.1AX Link Aggregation Control Protocol (LACP). The LACP specifications are described, for example, in IEEE standard 802.1AX-2008, cited above.

The manually configured LAG is referred to herein as "static LAG," and the dynamically configured LAG is referred to herein as "dynamic LAG" or "LACP-LAG". The description that follows mainly addresses an active/active dynamic LAG mode of operation, in which the two communicating parties negotiate and maintain the LAG by constantly sending dedicated data units (e.g., LACP data units or LACPDUs) to one another.

As will be described below, allocating ports that are configured as LAG members for communicating data traffic, to simultaneously deliver management traffic, may result in disruptions to the management traffic.

In some embodiments that are described herein, the network interface controller (also referred to as network adapter) emulates a single ported interface to the BMC. The network adapter separately filters data and management traffic packets received on each of the LAG member ports. The network adapter forwards data packets to the host and management packets to the BMC. In the opposite direction, the network adapter selects one of the LAG member ports to deliver management traffic sent by the BMC to the network.

In an embodiment, the network adapter additionally provides high availability to the management traffic. In the receive direction, if one of the LAG members fails, management traffic is forwarded to the BMC over the other LAG members. In the transmitting direction, when the link used to send BMC outgoing traffic fails, the network adapter selects another link from the LAG members links to replace the failing link.

In some embodiments, the network adapter continues to provide high availability when the server is in a state of standby or power down. In these states, to save power, the network adapter typically enables only a single port for communication. If, this port fails, the network adapter selects another port to replace it. The network adapter enables the selected port, disables all the other ports, and waits for the link over the enabled port to come up. If after a timeout period, the link is still down, the network adapter selects another port using the same procedure. In the context of the current invention and in the claims, the term "link up" or "port up" refers to a link that is operative for communication, whereas the term "link down" or "port down" refers to a link which is not yet established for communication.

In an embodiment, the server can be configured to run a software driver to execute the LACP, or alternatively to implement the LACP on the network adapter. The first mode is referred to as driver-based LACP, and the other as NIC-based LACP.

In some embodiments, when the server is in a standby or power down state, the network adapter enables a single port, which becomes available for data traffic. Therefore, during standby, power down, or when the server re-boots and has not yet enabled the software driver that initiates the LACP, the BMC may have no access to the network.

In the driver-based LACP mode, when the server re-boots (e.g., performs a network boot procedure), only after the boot process progresses, and the booted operating system enables the driver, the LACP can be executed and send LACPDUs to initiate the LAG. In an embodiment, the LACP should be activated and exchange LACPDUs as soon as the driver is executed, to avoid longer than necessary periods in which the BMC has no access to the network.

In NIC-based LACP mode, the network adapter initiates the LACP regardless of the booting state of the server. Therefore, in this mode the BMC can access the network immediately after power up, as well as during periods in which the server driver is not enabled.

Using the disclosed techniques, a network node equipped with a BMC can be remotely controlled, over a sideband channel, while simultaneously communicating data traffic over aggregated links. Without the disclosed techniques, such simultaneous operation would not be possible. Aggregating management traffic with high availability is also provided.

System Description

FIG. 1 is a block diagram that schematically illustrates a computer system 20, in accordance with an embodiment that is described herein. System 20 can be used in various applications, such as in server farms, campus or industrial computation systems, storage systems, data center systems and the like.

System 20 comprises network nodes or servers 24 denoted in the figure SERVER_1 and SERVER_2 that can each be remotely controlled by a control server 26. Nodes 24 and control server 26 communicate with one another over a communication network 32. In the example of FIG. 1, Network 32 comprises multiple network switches 36 that deliver the communicated data between the network nodes. In alternative embodiments, instead of or in addition to switches 36, any other suitable switching and/or routing network components can be used as well.

System 20 may use any suitable type of communication network and related protocols. For example, the network may comprise a local or a wide area network (WAN/LAN), a wireless network, or a combination of such networks. Additionally, the network may be a packet network such as IP (e.g., with TCP as the transport protocol), Infiniband, or Ethernet network, delivering information at any suitable data rate.

Figure 2:
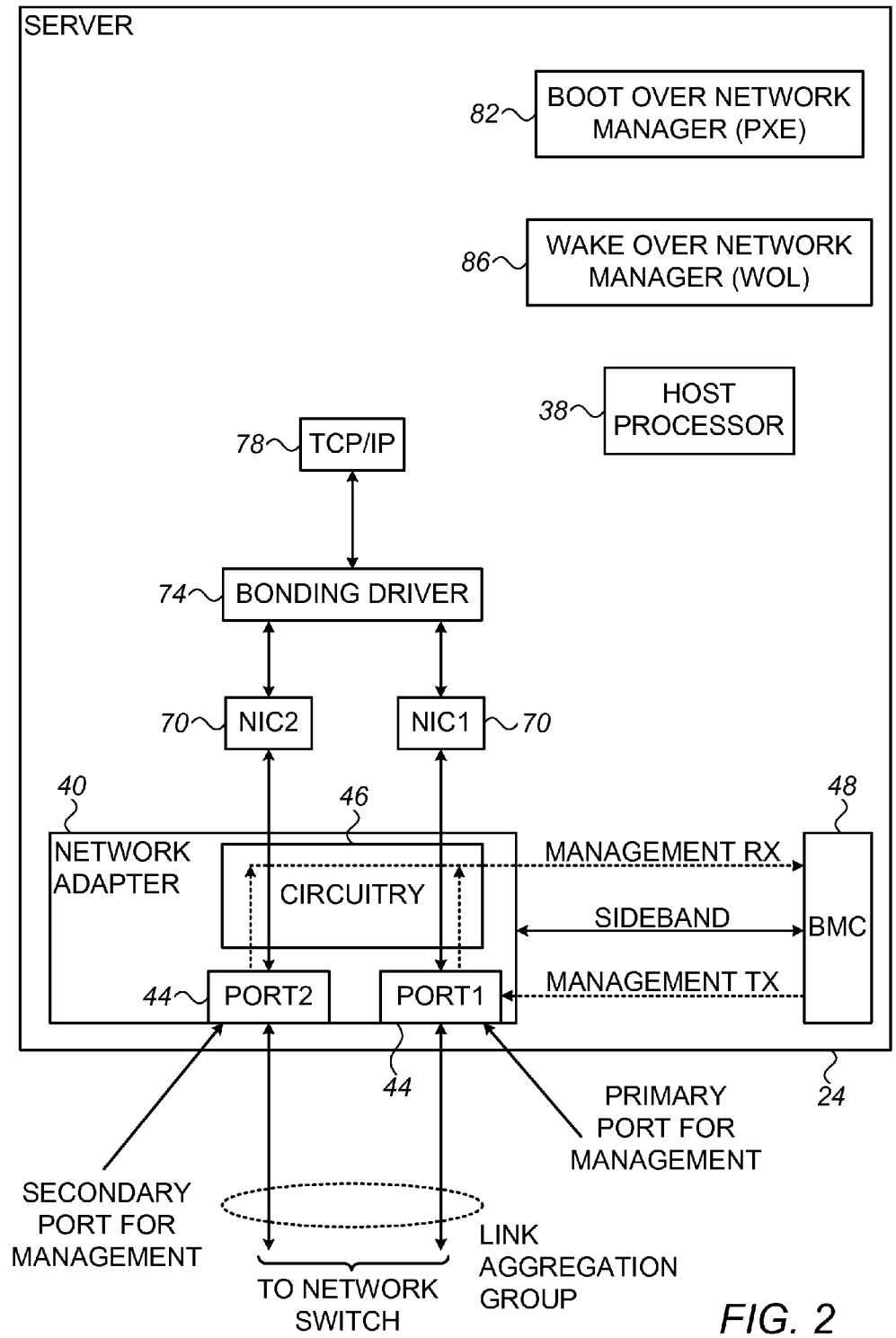
FIG. 2 is a block diagram that schematically illustrates the internal structure of a server shown in FIG. 1, in accordance with an embodiment that is described herein.

Server 24 comprises a network interface controller (NIC) 40, which is also referred to as a network adapter. In some embodiments, network adapter 40 comprises two ports 44 denoted PORT1 and PORT2, and circuitry 46 (shown in FIG. 2 below). In alternative embodiments, network adapter 40 may comprise any other suitable number of ports. Ports 44 in network adapter 40 serve as a physical and electrical interface to network 32. Server 24 further comprises a Baseboard Management Controller (BMC) 48, which supports remote monitoring and control of server 24. A detailed block diagram of server 24 is shown in FIG. 2, which is described further below.

Circuitry 46 carries out and manages the various tasks handled by network adapter 40, such as, for example, bidirectional delivery of data and management traffic. In the context of the present patent application and in the claims, circuitry 46 implements all the functionalities of network adapter 40 other than the adapter ports. In the description that follows, operations attributed to network adapter 40, excluding explicit operations of ports 44, are executed by circuitry 46.

Control server 26 typically executes a dedicated management and control program. The control program may control one or more network nodes, e.g., nodes 24, which are accessible via network 32 and are equipped with a baseboard management unit such as BMC 48. The program may execute control and monitor operations automatically, or triggered by a human user via a suitable user interface (not shown).

To communicate with node 24, control server 26 sends and receives, via switches 36 of network 32, management messages that create network management traffic. Management traffic sent by control server 26 may arrive at PORT1, PORT2, or both. Management traffic sent by the BMC is typically delivered through one of the ports to the network, and via switches 36 to control server 26. For example, in some embodiments, the control functionalities that are carried out by server 26 can be implemented on one or more servers 24.

The configuration of FIG. 1 is an exemplary system configuration, which is shown purely for the sake of conceptual clarity. Alternatively, any other system configuration can also be used.

FIG. 2 is a block diagram that schematically illustrates the internal structure of server 24 shown in FIG. 1, in accordance with an embodiment that is described herein. Server 24 comprises a host processor 38 that carries out the various tasks of server 24. The server further comprises network adapter 40, which connects to the network via ports 44, i.e., PORT1 and PORT2. Server 24 further comprises BMC 48 that communicates management traffic with control server 26. BMC 48 receives management instructions from control server 26 and executes the management instructions accordingly. For example, BMC 48 may receive from control server 26, management instructions to measure the temperature in the chassis of server 24 and send the measured temperature back to control server 26. Additionally, BMC 48 may be configured to monitor, in a passive or active manner, various activities that the server carries out during its operation, and to send monitoring reports or certain alerts when failure events occur, to control server 26.

BMC 48 accesses network 32 via network adapter 40 using a dedicated bidirectional sideband channel (denoted SIDEBAND in the figure). The sideband channel may comprise any suitable buses, interfaces, and protocols. For example, in some embodiments the sideband channel comprises the Management Component Transport Protocol (MCTP) and Network Controller Sideband Interface (NC-SI), over the System Management Bus (SMBus). Alternatively, the sideband channel may comprise the Intelligent Platform Management Interface (IPMI) over the SMBus. Additionally, in some embodiments the sideband or management channel comprises the MCTP and/or NC-SI, over the Peripheral Component Interface Express Bus (PCIe), thus sharing a common physical bus with host processor 38 (not shown). In some embodiments, the BMC may use one of a plurality of management channels as defined in MCTP.

The MCTP and NC-SI specifications are described, for example, in the Distributed Management Task Force (DTMF) standards "Management Component Transport Protocol (MCTP) Base Specification," Document Number: DSP0236, Jan. 24, 2013, version 1.2.0, and "Network Controller Sideband Interface (NC-SI) Specification," Document Number: DSP0222, Jan. 24, 2013, version 1.0.1, which are both incorporated herein by reference.

The IPMI specifications are described, for example, in "-IPMI- Intelligent Platform Management Interface Specification," Oct. 1, 2013, second generation, V2.0, revision 1.1, which is incorporated herein by reference. The SMBus specifications are described, for example, in "System Management Bus (SMBus) Specification," Aug. 3, 2000, version 2.0, which is incorporated herein by reference.

Network adapter 40 handles bidirectional data and management traffic between switch 36 to which it connects, and host 38 and BMC 48, respectively. Server 24 may communicate data traffic with other servers or devices (e.g., such as servers 24) or control server 26. Network adapter 40 separates between incoming management and data traffic using predefined or configurable traffic filters. Adapter 40 filters the incoming traffic, and directs data traffic arriving at PORT1 and PORT2 to software network communication interfaces (NICs) 70, denoted NIC1 and NIC2 respectively. The network adapter directs management traffic filtered from the traffic arriving at PORT1 and PORT2 to BMC 48.

In the example of FIG. 2, to handle link aggregation over multiple network adapter ports (e.g., PORT1 and PORT2), server 24, network adapter 40, and its connected switch 36 should be configured suitably. In link aggregation mode, data traffic arriving at PORT1 and PORT2 is forwarded trough NIC1 and NIC2, to a bonding driver 74 that bundles the separate traffic links to the single aggregated logical trunk. In some embodiments, bonding driver 74 is implemented as part of the server's operating system (OS), such as, for example, the Linux OS. Bonding driver 74 delivers the aggregated traffic to a TCP/IP module 78, to process the TCP and IP communication protocols.

While sending data toward the network, the server may transmit the data via each, or all, of the LAG ports 44. As will be described below, the configuration of link aggregation for the data traffic may result in disruption to the BMC management traffic.

Server 24 further comprises a boot over the network manager 82, and a wake over the network manager 86. Manager 82 may be implemented as a software client that server 24 executes to support the network boot functionality. Manager 86 is typically implemented as a combination of network adapter 40 and configuration software, to support the network wakeup functionality. Boot manager 82 enables a remote node to cause server 24 to re-boot, by loading boot management programs and related resources that are stored on other network servers.

Boot manager 82, may comprise, for example, the Preboot Execution Environment (PXE), which is described, for example, in "Preboot Execution Environment (PXE) Specification," Sep. 20, 1999, version 2.1, which is incorporated herein by reference. Wake over the network manager 86 may be implemented, for example, in combination of hardware and software, so as to recognize an incoming dedicated "magic packet" sent to wake the server up from a sleep or standby state. Manager 86 may comprise, for example, the Wake-On-Lan (WOL) protocol. Specifications for the magic packet are described, for example, in an AMD white-paper titled "Magic Packet Technology," publication number 20213, revision A, Amendment/0, November 1995, which is incorporated herein by reference.

The server and network adapter configurations of FIG. 2 are exemplary configurations, which are shown purely for the sake of conceptual clarity. Any other suitable server and/or network adapter configuration can also be used. Elements that are not necessary for understanding the principles of the present invention, such as various interfaces, addressing circuits, timing and sequencing circuits and debugging circuits, have been omitted from the figure for clarity.

In the exemplary configuration shown in FIG. 2, network adapter 40 and BMC 48 are implemented as boards or Integrated Circuits (ICs) that are separated from the hardware of the server. In alternative embodiments, however, the network adapter, the BMC or both may be integrated with the server hardware, for example, on the mother board of the server, and may be interconnected by internal buses. Further alternatively, some or all of the functionality of network adapter 40 can be implemented in software and carried out by host processor 38, or other processor in the server.

In some embodiments, host processor 38 and BMC 48 are integrated into one hardware device.

In some embodiments, host processor 38, BMC 48 or both comprise general-purpose processors, which are programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The different elements of network adapter 40 may be implemented using any suitable hardware, such as in an Application-Specific Integrated Circuit (ASIC) or Field-Programmable Gate Array (FPGA). In some embodiments, some elements of network adapter 40 can be implemented using software, or using a combination of hardware and software elements.

Handling Data and Management Traffic on Aggregated Links

The description that follows assumes that server 24 can be configured in two link aggregation modes, i.e., static and dynamic modes. In the static link aggregation mode, LAG member ports in network adapter 40 and its connected switch 36 are configured manually. In the dynamic link aggregation, the two communicating parties, i.e., both server 24 and switch 36 run some link aggregation protocol to automatically negotiate, set up, and maintain, the LAG members and respective ports, and to manage the aggregation of the traffic over the LAG members.

Server 24 may use any suitable dynamic link aggregation protocol. In some embodiments, server 24 and its connected switch 36 employ the Link Aggregation Control Protocol (LACP), which is described, for example, in the IEEE standard 802.1AX, cited above. The description that follows assumes using the LACP for dynamic link aggregation.

In some embodiments, host processor 38 executes the LACP as part of bonding driver 74 or possibly using some other driver or program. This mode is referred to herein as driver-based LACP. In other embodiments, network adapter 40 executes the LACP, which mode is referred to herein as NIC-based LACP.

In the description that follows, we assume an active/active dynamic link aggregation configuration. In active/active mode, both communicating parties initiate LACP data units (LACPDUs) to negotiate and maintain ports that become members of the LAG. Member ports of the LAG may all belong to the same network adapter, or alternatively to multiple network adapters. Similarly, member ports in connected switch 36 may reside on a single switch 36 or alternatively reside on separate multiple switches 36 (also referred to as stacked-switch LAG).

When the server is up and running (as opposed to sleep, standby, or power down states), and the server and its connected switch are configured to operate in either static or dynamic link aggregation mode, network adapter 40 and bonding driver 74 properly manage the aggregation of the host data traffic, including high availability (in dynamic LAG mode) even in the presence of management traffic. In other words, BMC management traffic that is filtered out and delivered over the sideband channel to the BMC does not interfere with aggregating the host data traffic links.

Under the operation of link aggregation, however, the BMC management traffic may be disrupted, as explain herein. For example, the NC-SI standard specifies using a single port for a sideband channel. Under such a constraint, management traffic that would be delivered on other LAG member links will fail to be delivered to the BMC. Moreover, if the port that was allocated for the management traffic fails, the management traffic is normally not routed to other ports, and access to the BMC may be completely lost.

In an embodiment, network adapter 40 emulates a single package single channel device to the BMC, by aggregating management traffic received on the LAG member ports. Network adapter 40 recognizes management packets sent over the LAG member ports, filters these packets out, and delivers the filtered management packets to the BMC over the sideband channel. Network adapter 40 applies predefined or configurable traffic filters (e.g., a filter that separates between data and management traffic) to traffic received in each of the LAG member ports.

In some situations, the incoming traffic comprises duplicate management packets, such as, for example, in sending broadcast or flooding packets. In an embodiment, when adapter 40 receives duplicate management packets over multiple member ports of the LAG simultaneously, the network adapter delivers only one copy of the duplicate packets to the BMC. When the arrival of the duplicate packets, however, is not simultaneous, the BMC may receive these duplicate packets and should handle them by itself.

As yet another example, some of the management packets sent by the BMC may carry information other than monitor or control information, e.g., packets that deliver configuration or dynamic status information, such as, for example, flow control packets. Network adapter 40 duplicates such packets over the individual LAG member links.

In some embodiments, in addition to aggregating the incoming management traffic, network adapter 40 also reflects aggregated status attributes of the LAG members to the BMC. For example, network adapter 40 calculates an aggregated link status by applying logical OR to the multiple link status indications of the LAG members. Thus, when one or more of the member links is up, the aggregated status as seen by the BMC is link up as well.

As another example, in some embodiments, network adapter 40 separately counts the amount of management traffic coming on the individual member links. Adapter 40 accumulates the individual sums to deliver an aggregated management traffic count to the BMC.

We now describe embodiments in which network adapter 40 handles the assignment of ports for management traffic sent by BMC 48, and to data traffic handled by a driver-based LACP or NIC-based LACP. Network adapter 40 defines one of the LAG ports as the primary port (e.g., PORT1 in FIG. 2) and all the other ports as secondary ports (e.g., PORT2 in FIG. 2). In a NIC-based LACP embodiment, network adapter 40 first attempts to send the BMC outgoing traffic via the primary port. If, however the primary port is unavailable, network adapter 40 uses one of the secondary ports to deliver the BMC management traffic to the network, thus providing high availability.

In another embodiment, the server executes a driver-based LACP (e.g., as part of bonding driver 74). In this case, network adapter 40 selects a port for the BMC outgoing traffic while giving priority to ports that the server already selected for the LAG via the LACP. Consider an example embodiment, in which the server uses one of the secondary ports for sending LACPDUs. In this example, network adapter 40 should also use the selected secondary port for sending the BMC outgoing traffic, since otherwise the LACP running on switch 36 may recognize that the primary port is enabled but exchanges no LACPDUs, and therefore set this port to an individual suspended state, thus blocking the BMC traffic.

Faulty operation may result when operating in driver-based LACP mode, since the network adapter may not be always fully aware of the LACP state of the ports (e.g., which ports are assigned by the LACP as the active LAG members). For example, wrongly configured LACP across two different network adapters may cause BMC management traffic delivered over the wrongly configured network adapter to be lost. As another example, the network adapter may attempt to deliver management traffic over ports that were disabled due to misconfiguration of the LACP.

Figure 3:
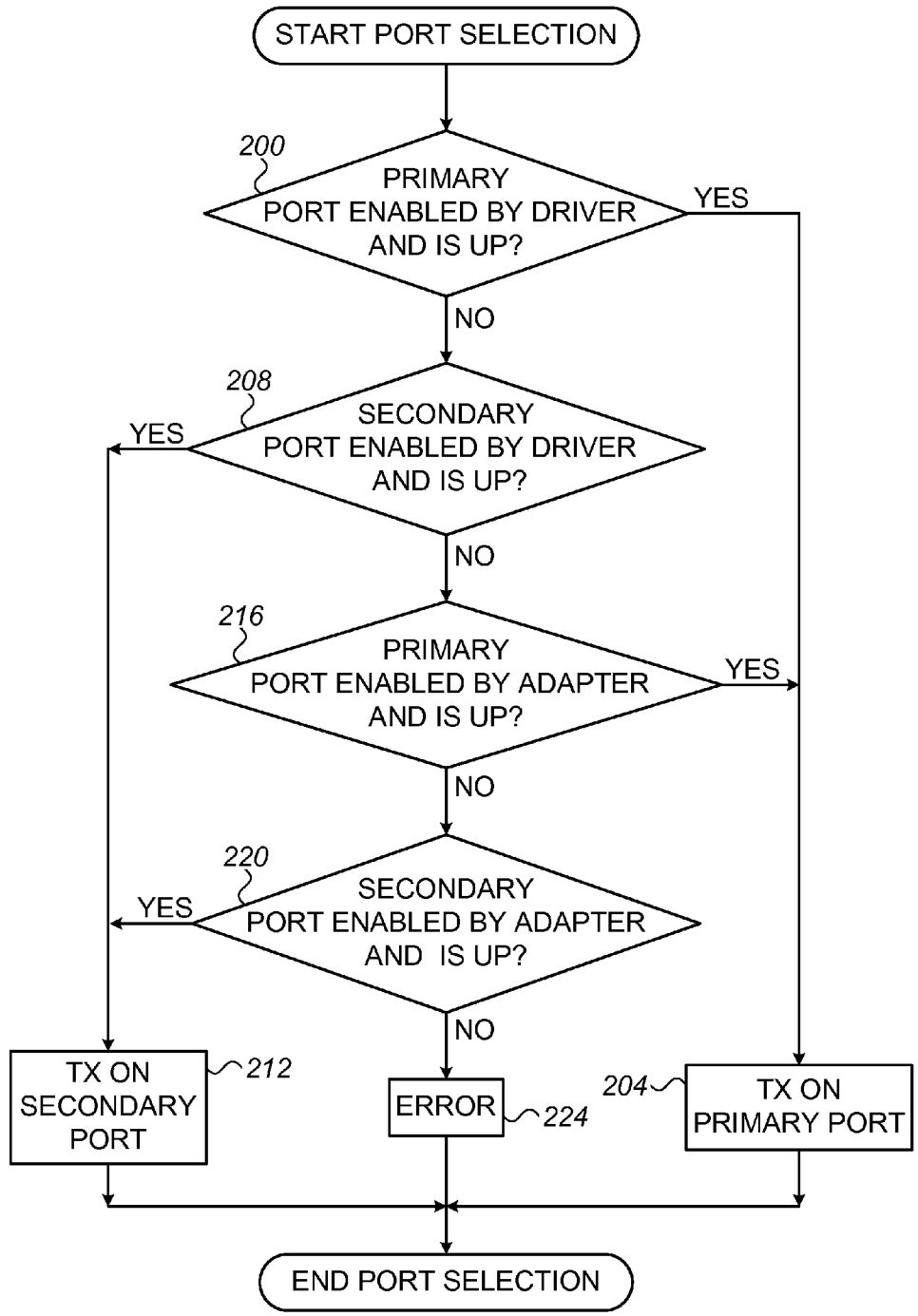
FIG. 3 is a flow chart that schematically illustrates a method for selecting a network adapter port for delivering outgoing Baseboard Management Controller (BMC) traffic, in accordance with an embodiment that is described herein.

FIG. 3 is a flow chart that schematically illustrates a method for selecting a network adapter port for delivering outgoing BMC traffic, in accordance with an embodiment that is described herein. The method assumes operating in the driver-based LACP mode, but is also applicable in the NIC-based LACP mode. The method begins by network adapter 40 checking whether the primary port was already enabled by the server driver, at a primary driver checking step 200. In the method of FIG. 3, when checking whether a certain port is enabled, the network adapter also verifies that the link over this port is up.

If the primary port at step 200 was enabled, network adapter 40 selects the primary port for transmitting BMC traffic, at a primary selection step 204, and the method then terminates. Otherwise, network adapter 40 checks whether one or more of the secondary management ports was enabled by the driver, at a secondary driver checking step 208.

If the result at step 208 is positive, the network adapter selects one of the enabled secondary ports for the BMC outgoing traffic, at a secondary selection step 212. If the result at step 208 is negative, no primary or secondary port was enabled by the driver and the network adapter checks whether the network adapter itself already enabled the primary port for management traffic, at an adapter primary checking step 216, and selects the primary port at step 204 if the result is positive. Otherwise, network adapter 40 checks whether it enabled any of the secondary ports at an adapter secondary checking step 220, and selects one of the secondary ports among the enabled ports. Otherwise, network adapter 40 alerts an error, at an alerting step 224. Following selection steps 204 or 212, or alerting step 224, the method terminates.

Port Usage and High Availability for Management Traffic

In some embodiments, to save power, server 24 may enter a standby or power-down state. In standby, the server operation typically freezes, and only a minimal set of essential hardware and software modules remain active. Upon receiving a wakeup trigger, the server quickly resumes full power operation. In power-down state, the server is shut down, but the network adapter is able to receive incoming traffic. Upon receiving a wakeup trigger, the server powers up and then re-boots to resume operation. In some embodiments, resuming operation from standby also involves re-booting the server. In both the standby and power down states, network adapter 40 may also be configured to save power, and therefore activates only a single port for communication (e.g., the primary port). In the power saving states, the LACP is disabled, no LACPDUs are exchanged and therefore the single enabled port becomes an individual port, which is used for delivering data traffic.

In an embodiment, when in standby and selecting a communication port, or when the single enabled port fails, network adapter 40 alternately enables the network adapter ports, starting, for example, with the primary port, until finding a port in which the link comes up. This technique or feature may be regarded as providing high availability during standby mode.

Figure 4:
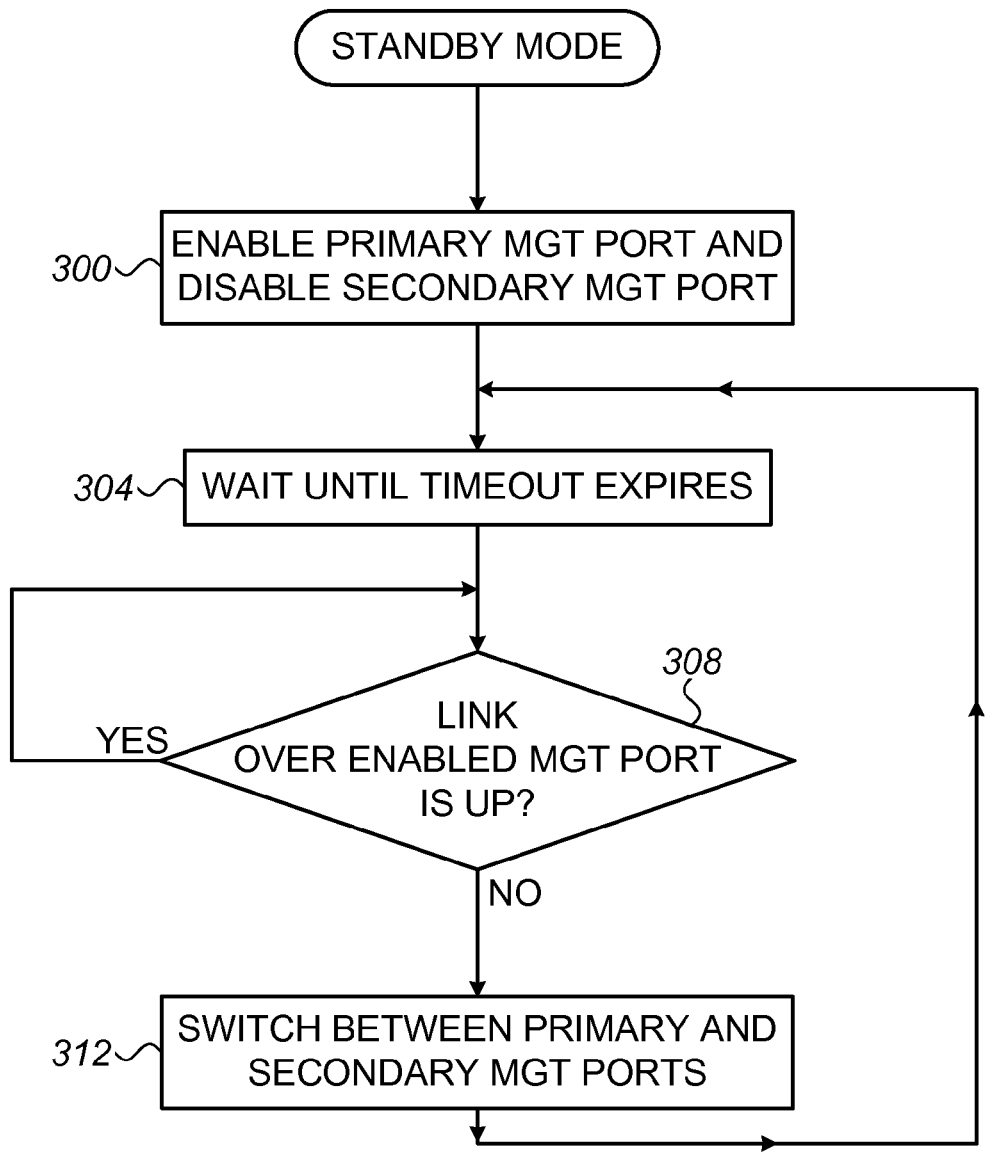
FIG. 4 is a flow chart that schematically illustrates a method for alternately selecting communication ports while in standby or power down state, in accordance with an embodiment that is described herein.

FIG. 4 is a flow chart that schematically illustrates a method for alternately selecting communication ports while in standby or power down state, in accordance with an embodiment that is described herein. The method of FIG. 4 assumes that network adapter 40 comprises two ports, i.e., primary and secondary ports. The method begins at a primary enabling step 300, in which network adapter 40 enables the primary port and disables the secondary port. Then, network adapter 40 waits a predefined timeout period for the link to come up, at a waiting step 304. In an embodiment, network adapter 40 configures a timeout period of ten seconds, but any other suitable period can also be used.

At a link monitoring step 308, network adapter 40 checks whether the link over the port that is currently enabled is up.

If the link is up, the network adapter uses this link for management traffic and loops over step 308. Otherwise, the network adapter switches the roles of the ports by enabling the secondary port and disabling the primary port, at a port switching step 312. Network adapter then loops back to step 304 to wait for the link over the secondary port to come up. The method thus continues to alternately enable one port and disable the other, until either port achieves a link up status.

The method described in FIG. 4 is an exemplary method, and other methods can be used in alternative embodiments. For example, instead of starting with enabling the primary port, the network adapter can start with the port that was last active before the method initiates. Although the method of FIG. 4 is described for only two ports, alternative embodiments may extend the method to any suitable number of ports.

We now describe port assignment and usage for the management traffic when the server is up and running. In static LAG mode, the network adapter can enable both the primary and secondary ports to be used for bidirectional data and management traffic immediately following power up.

When the server is configured to driver-based LACP, network adapter 40 selects a port for outgoing BMC traffic similarly to the method described in FIG. 4 above. Additionally, the network adapter enables ports that the server specifically requests. When in the NIC-based LACP mode, if the primary and secondary ports are available, then the network adapter 40 enables both the primary and secondary ports, and initiates the link aggregation by executing the LACP protocol, which sends LACPDUs to the respective switch. If, when in the NIC-based LACP mode, only one link of the primary and secondary ports can be used, network adapter 40 selects a port for outgoing BMC traffic similarly to the method described in FIG. 4.

Establishing Link Aggregation While Executing Network Boot and Wakeup

As described above, when the server is in the standby state, network adapter 40 enables a single port for communication. Since neither the driver nor the network adapter sends any LACPDUs, the respective connected switch makes the link over the enabled port an individual active link, used for data traffic.

In an embodiment, when the server is configured to driver-based LACP mode and receives a local or remote indication to wake-up or to re-boot, boot over the network manager 82 starts executing network boot process using, for example, the PXE cited above. During the PXE boot, network adapter 40 enables the primary port, and the driver enables one or more of the secondary ports. Since during the PXE boot, bonding driver 74 (and therefore also the LACP) is not yet executed, no LACPDUs are sent, and the links that are established over the two ports become individual active links. Note that since the individual ports may become members of the LAG when the LACP later initiates link aggregation (as will be described below), switch 36 should be configured not to suspend ports that are individual.

Following the execution of the PXE process, as the OS boots, the OS enables bonding driver 74. The bonding driver, when enabled, initiates link aggregation by initiating the LACP that exchanges LACPDUs over the enabled ports, which then became LAG members. Network adapter 40 should use one of the LAG member ports to send BMC management traffic, and the respective connected switch may initiate the links over any of the LAG members' ports. Moreover, to shorten the period in which the BMC has no access to the network, the LACP should establish the LAG trunk as soon as the driver is enabled, and exchange LACPDUs at the highest rate available.

When the server is configured to the NIC-based LACP mode, and receives an instruction to wake up, the wake over the network manager 86 starts the wakeup process which is then followed by the PXE network boot process. Unlike in the driver-based LACP mode, in which the LACP is initiated only when the bonding driver is enabled, in the NIC-based LACP mode, network adapter 40 enables the primary and secondary ports during the wakeup, and initiates the LACP protocol. The LACP protocol exchanges LACPDUs with the respective switch, and the ports become active LAG members. The established link aggregation continues to operate during booting the OS and when the OS is up.

The NIC-based mode is advantageous over the driver-based LACP since when the network adapter executes the LACP, the BMC becomes seamlessly accessible as soon as the LACP establishes the LAG trunk, regardless of the booting state of the server. Moreover, with NIC-based LACP, standard switches (36) need no special configurations other than enabling the switch to perform link aggregation.

In some embodiments, server 24 comprises wake over the network manager 86. Manager 86 may use, for example, the WOL protocol described above. The WOL protocol may be configured to send the waking "magic packet" to the Media Access Control (MAC) addresses of the primary, secondary, or both ports.

In an embodiment, to save power when in standby, although configuring the WOL to send the "magic packet" to both ports, network adapter 40 enables only a single port for communication. In this embodiment, the network adapter monitors the enabled link status and upon link failure switches to the other port, similarly to the method described in FIG. 4 above.

The methods described above are exemplary methods, and other methods can be used in alternative embodiments. For example, in some embodiments, one or more of the described methods are enabled or disabled by a respective configuration parameter.

The methods described above may perform better when the network switches are configured properly. For example, the network switches may be configured not to suspend individual ports (so as to enable LACP to bind these ports in a LAG) as described above.

In some embodiments, a configuration parameter enables or disables the combined operation of LAG and BMC on the network adapter. In an embodiment, to enable fast LACP initiation, this parameter is implemented in a non-volatile memory of the network adapter.

The embodiments described above refer mainly to remotely controlling a single BMC over a LAG connection. The disclosed techniques are also applicable, however, to a server that comprises multiple BMCs, wherein each of the BMCs communicates separate management traffic, and executes separate management tasks. Two or more of the multiple BMCs may communicate over the same LAG connection.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a network node that includes a network adapter, a Baseboard Management Controller (BMC) and a host, communicating management packets between the network adapter and the BMC over a sideband channel that supports using only a single port of the network adapter for accessing a communication network;
connecting to a switch in the communication network using multiple ports, comprising at least a first port and a second port, of the network adapter, and configuring the multiple ports as member ports of a same Link Aggregation Group (LAG); and
exchanging the management packets between the BMC and a control server, by emulating by the network adapter a single ported interface toward the sideband channel to the BMC, and simultaneously exchanging data packets between the host and a remote node, over the communication network, via at least the first and second ports of the network adapter, wherein both the management packets exchanged with the BMC over the sideband channel and the data packets exchanged with the host are distributed over all of the member ports of the same LAG, and wherein the management packets distributed over all of the member ports of the same LAG are exchanged with the BMC regardless of a boot state of the host.

2. The method according to claim 1, wherein simultaneously exchanging the data packets and the management packets comprises executing, in the network adapter, a Link Aggregation Control Protocol (LACP) that negotiates a LAG configuration with the switch.

3. The method according to claim 2, wherein connecting to the switch comprises selecting one of the multiple ports for outgoing management packets so that a port that was defined by the LACP as a LAG member port is selected prior to other ports.

4. The method according to claim 1, wherein exchanging the data packets and the management packets comprises separating between the data packets and the management packets that are received over each of the multiple ports, forwarding the management packets to the BMC via the sideband channel and forwarding the data packets to the host.

5. The method according to claim 4, wherein emulating the single ported interface comprises indicating to the BMC a total number of the management packets received on both the first and the second ports.

6. The method according to claim 4, wherein exchanging the management packets comprises receiving duplicate management packets on the first and second ports, and wherein forwarding the management packets comprises forwarding only one copy of a given duplicate management packet to the BMC.

7. The method according to claim 1, wherein exchanging the management packets comprises sending to the control server configuration and dynamic status information via both the first and second ports.

8. The method according to claim 1, wherein emulating the single ported interface comprises indicating to the BMC a link up status by performing a logical OR between respective individual link up status indications of the first and second ports.

9. The method according to claim 1, wherein connecting to the switch comprises operating the first and second ports in a power saving mode of the network adapter, by activating only the second port in response to a connection failure that occurs when activating only the first port.

10. The method according to claim 1, wherein exchanging the management packets and the data packets comprises delivering the management packets and the data packets via an active port selected between the first and second ports, and switching to the other of the first and second ports in response to detecting a link failure on the active port.

11. The method according to claim 1, wherein connecting to the switch comprises executing a Link Aggregation Control Protocol (LACP) that negotiates a LAG configuration with the switch.

12. The method according to claim 11, wherein executing the LACP comprises executing the LACP in a bonding driver of the network node, and wherein connecting to the switch comprises selecting one of the first and second ports for outgoing management packets so that a port that was defined by the LACP as a LAG member port is selected prior to other ports.

13. A network adapter in a network node, the network adapter comprising:
multiple ports comprising at least a first port and a second port, which are configured to connect to a switch in a communication network, and are configured as same member ports of a Link Aggregation Group (LAG); and
circuitry, which is configured to communicate management packets between the network adapter and a Baseboard Management Controller (BMC) of the network node over a sideband channel that supports using only a single port of the network adapter for accessing the communication network, by emulating a single ported interface toward the sideband channel to the BMC, to exchange the management packets between the and a control server, and to simultaneously exchange data packets between a host of the network node and a remote node, over the communication network, via at least the first and second ports of the network adapter, wherein both the management packets exchanged with the BMC over the sideband channel and the data packets exchanged with the host are distributed over all of the member ports of the same LAG, and wherein the management packets distributed over all of the member ports of the same LAG are exchanged with the BMC regardless of a boot state of the host.

14. The network adapter according to claim 13, wherein the circuitry is configured to execute, in the network adapter, a Link Aggregation Control Protocol (LACP) that negotiates a LAG configuration with the switch.

15. The network adapter according to claim 14, wherein the circuitry is configured to select one of the multiple ports for outgoing management packets so that a port that was defined by the LACP as a LAG member port is selected prior to other ports.

16. The network adapter according to claim 13, wherein the circuitry is configured to separate between the data packets and the management packets that are received over each of the multiple ports, to forward the management packets to the BMC via the sideband channel, and to forward the data packets to the host.

17. The network adapter according to claim 16, wherein the circuitry is configured to indicate to the BMC a total number of the management packets received on both the first and the second ports.

18. The network adapter according to claim 16, wherein the circuitry is configured to receive duplicate management packets on the first and second ports, and to forward only one copy of a given duplicate management packet to the BMC.

19. The network adapter according to claim 13, wherein the circuitry is configured to send to the control server configuration and dynamic status information via both the first and second ports.

20. The network adapter according to claim 13, wherein the circuitry is configured to indicate to the BMC a link up status by performing a logical OR between respective individual link up status indications of the first and second ports.

21. The network adapter according to claim 13, wherein the circuitry is configured to operate the first and second ports in a power saving mode of the network adapter, by activating only the second port in response to a connection failure that occurs when activating only the first port.

22. The network adapter according to claim 13, wherein the circuitry is configured to deliver the management packets and the data packets via an active port selected between the first and second ports, and to switch to the other of the first and second ports in response to detecting a link failure on the active port.

23. The network adapter according to claim 13, wherein the circuitry is configured to connect the first and second ports to the switch by executing a Link Aggregation Control Protocol (LACP) that negotiates a LAG configuration with the switch.

24. The network adapter according to claim 23, wherein the LACP is executed by a bonding driver of the network node, and wherein the circuitry is configured to select one of the first and second ports for outgoing management packets so that a port that was defined by the LACP as a LAG member port is selected prior to other ports.

* * * * *